(12) United States Patent
Salamon et al.

(10) Patent No.: US 9,909,503 B2
(45) Date of Patent: Mar. 6, 2018

(54) GAS TURBINE ENGINE INCLUDING VANE STRUCTURE AND SEAL TO CONTROL FLUID LEAKAGE

(71) Applicant: United Technologies Corporation, Hartford, CT (US)

(72) Inventors: Keith T. Salamon, Middletown, CT (US); Matthew A. Turner, Wallingford, CT (US); Christopher M. Quinn, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 298 days.

(21) Appl. No.: 14/428,379

(22) PCT Filed: Feb. 22, 2013

(86) PCT No.: PCT/US2013/027237
§ 371 (c)(1),
(2) Date: Mar. 16, 2015

(87) PCT Pub. No.: WO2014/051668
PCT Pub. Date: Apr. 3, 2014

(65) Prior Publication Data
US 2015/0226130 A1 Aug. 13, 2015

Related U.S. Application Data

(60) Provisional application No. 61/705,772, filed on Sep. 26, 2012.

(51) Int. Cl.
*F02C 7/28* (2006.01)
*F02C 3/10* (2006.01)
(Continued)

(52) U.S. Cl.
CPC .............. *F02C 7/28* (2013.01); *F01D 9/02* (2013.01); *F01D 11/001* (2013.01); *F02C 3/10* (2013.01); *F05D 2220/36* (2013.01)

(58) Field of Classification Search
CPC ........ F02C 7/28; F01D 11/001; F01D 11/005; F01D 9/02; F01D 9/041; F01D 9/042;
(Continued)

(56) References Cited

U.S. PATENT DOCUMENTS 4,300,868 A  11/1981  Wilkinson et al.
4,314,792 A  2/1982  Chaplin
(Continued)

FOREIGN PATENT DOCUMENTS

EP  0616112  10/2002
EP  1544415  6/2005
(Continued)

OTHER PUBLICATIONS

International Preliminary Report on Patentability for PCT Application No. PCT/US2013/027237 dated Apr. 9, 2015.
(Continued)

*Primary Examiner* — Nathaniel Wiehe
*Assistant Examiner* — Elton Wong
(74) *Attorney, Agent, or Firm* — Carlson, Gaskey & Olds, P.C.

(57) ABSTRACT

A gas turbine engine includes a core engine, a fan coupled to be driven by the core engine, a first case structure around the core engine and a second case structure around the fan. The first case structure and the second case structure define a bypass passage there between. A vane structure includes an airfoil extending radially between the first case structure and the second case structure. A seal is configured to control leakage between the bypass passage and a core engine.

22 Claims, 3 Drawing Sheets

(51) Int. Cl.
*F01D 9/02* (2006.01)
*F01D 11/00* (2006.01)

(58) Field of Classification Search
CPC ............. F05D 2220/36; F05D 2240/55; F05D 2240/57; F05B 2240/57
See application file for complete search history.

(56) References Cited

U.S. PATENT DOCUMENTS

| | | | |
|---|---|---|---|
| 4,470,754 A | 9/1984 | Manente | |
| 5,407,319 A | 4/1995 | Harrogate et al. | |
| 6,579,065 B2 * | 6/2003 | Scott | F01D 11/006 416/193 A |
| 6,931,849 B2 | 8/2005 | Parker | |
| 7,527,469 B2 * | 5/2009 | Zborovsky | F01D 9/041 277/412 |
| 8,087,874 B2 | 1/2012 | Jardine | |
| 2007/0137175 A1 | 6/2007 | Moniz | |
| 2007/0277752 A1 * | 12/2007 | Smith | F04D 29/083 123/41.49 |
| 2009/0097967 A1 | 4/2009 | Smith et al. | |
| 2009/0320441 A1 * | 12/2009 | Selder | F02C 3/10 60/39.092 |
| 2009/0324394 A1 * | 12/2009 | Weaver | F01D 11/001 415/173.7 |
| 2010/0080692 A1 * | 4/2010 | Tudor | F01D 9/042 415/139 |
| 2012/0306166 A1 * | 12/2012 | Melton | F01D 9/023 277/637 |
| 2013/0113236 A1 * | 5/2013 | Oomen | B60J 10/84 296/192 |

FOREIGN PATENT DOCUMENTS

| | | |
|---|---|---|
| EP | 1609952 | 1/2008 |
| EP | 2074305 | 8/2012 |

OTHER PUBLICATIONS

International Search Report and the Written Opinion for PCT Application No. PCT/US2013/027237 dated May 30, 2013.

* cited by examiner

GAS TURBINE ENGINE INCLUDING VANE STRUCTURE AND SEAL TO CONTROL FLUID LEAKAGE

CROSS REFERENCE TO RELATED APPLICATION

This application claims priority to U.S. Provisional Application No. 61/705,772, which was filed 26 Sep. 2012 and is incorporated herein by reference.

BACKGROUND OF THE INVENTION

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Turbine engine manufacturers continue to seek further improvements to engine performance and assembly including improvements to thermal, transfer, assembly and propulsive efficiencies.

SUMMARY

A gas turbine engine according to an exemplary aspect of the present disclosure includes a core engine, a fan coupled to be driven by the core engine, a first case structure around the core engine, and a second case structure around the fan. The first case structure and the second case structure define a bypass passage there between. A vane structure includes an airfoil which extends radially between the first case structure and the second case structure, and a seal configured to control fluid leakage between the bypass passage and the core engine.

In a further non-limiting embodiment of any of the foregoing examples, the seal is located at a radially inner side of the vane structure.

In a further non-limiting embodiment of any of the foregoing examples, the seal is hollow.

In a further non-limiting embodiment of any of the foregoing examples, the seal is flexible.

In a further non-limiting embodiment of any of the foregoing examples, the seal is elastomeric.

In a further non-limiting embodiment of any of the foregoing examples, the seal includes reinforced elastomer.

In a further non-limiting embodiment of any of the foregoing examples, the seal includes a rounded, hollow bulb.

In a further non-limiting embodiment of any of the foregoing examples, the seal includes an attachment section which secures the seal to a panel that is located inwards of the vane structure.

In a further non-limiting embodiment of any of the foregoing examples, the attachment section includes a pair of spaced apart legs.

In a further non-limiting embodiment of any of the foregoing examples, the seal is within a gas passage between the core engine and the bypass passage, and further comprising wear member within the gas passage inwards of the seal.

In a further non-limiting embodiment of any of the foregoing examples, the seal includes a seal flap bearing against the vane structure.

A gas turbine engine according to an exemplary aspect of the present disclosure includes a vane structure which includes an airfoil extending outwardly therefrom, a panel which includes a section arranged inwards of the vane structure and a seal arranged inwards of the vane structure, between the vane structure and the panel.

In a further non-limiting embodiment of any of the foregoing examples, the panel bounds a fan bypass passage.

In a further non-limiting embodiment of any of the foregoing examples, the seal is hollow.

In a further non-limiting embodiment of any of the foregoing examples, the seal is flexible.

In a further non-limiting embodiment of any of the foregoing examples, the seal includes a rounded, hollow bulb.

In a further non-limiting embodiment of any of the foregoing examples, the seal is within a gas passage between the core engine and the bypass passage, and further comprising a wear member within the gas passage inwards of the seal.

In a further non-limiting embodiment of any of the foregoing examples, the seal includes an attachment section securing the seal to a panel that is located inwards of the vane structure, the attachment section including a pair of spaced apart legs.

In a further non-limiting embodiment of any of the foregoing examples, the seal includes a seal flap bearing against the vane structure.

A method for use with a gas turbine engine according to an exemplary aspect of the present disclosure includes controlling fluid leakage between the bypass passage and the core engine using a seal.

BRIEF DESCRIPTION OF THE DRAWINGS

The various features and advantages of the present disclosure will become apparent to those skilled in the art from the following detailed description. The drawings that accompany the detailed descriptions can be briefly described as follows.

DESCRIPTION

Figure 1:
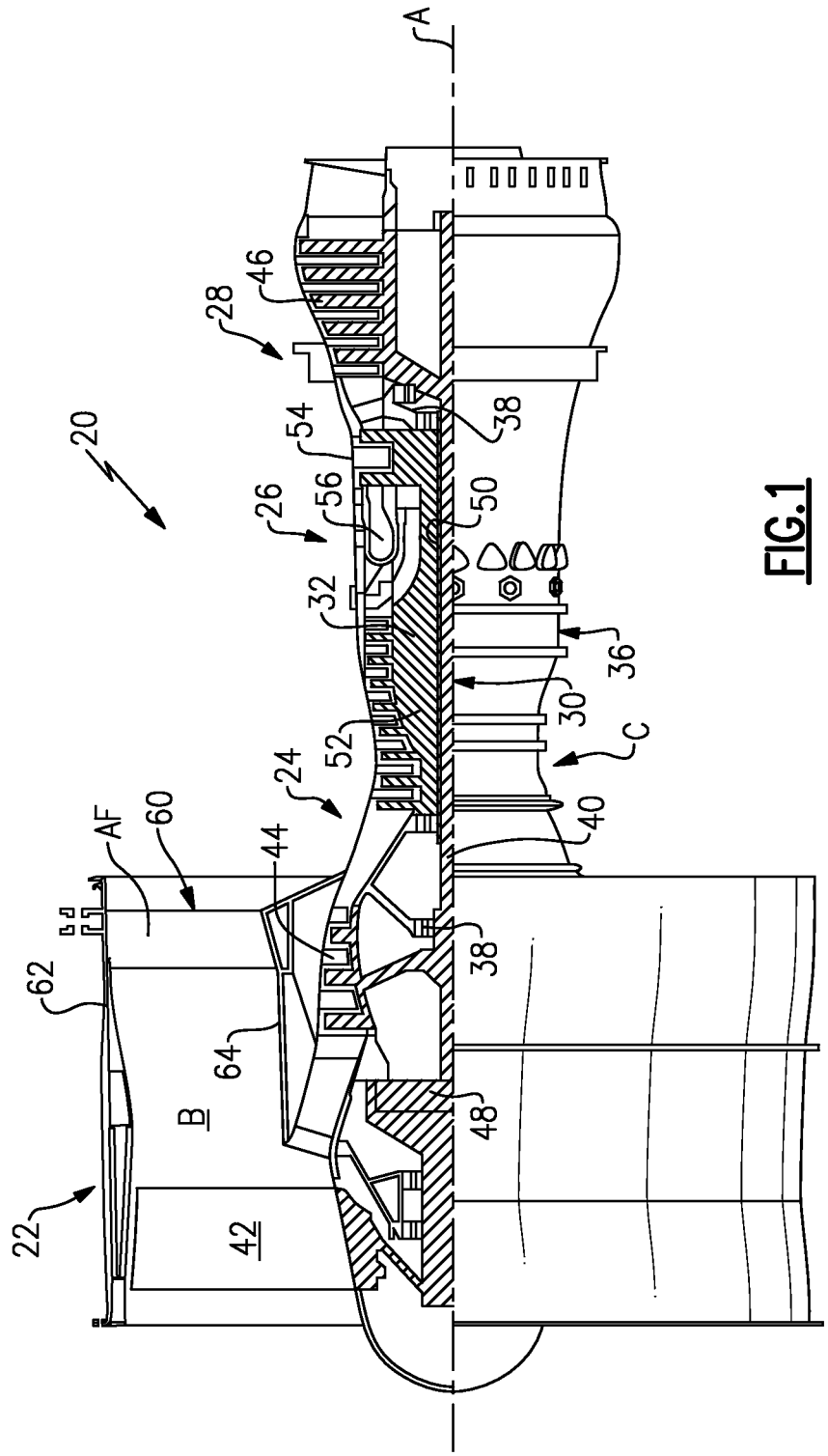
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. In this example, the compressor section 24, the combustor section 26 and the turbine section 28 are sections of a core engine C. Alternative engines might include an augmentor section (not shown) among other systems or features. The fan section 22 drives air along a bypass flowpath B while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
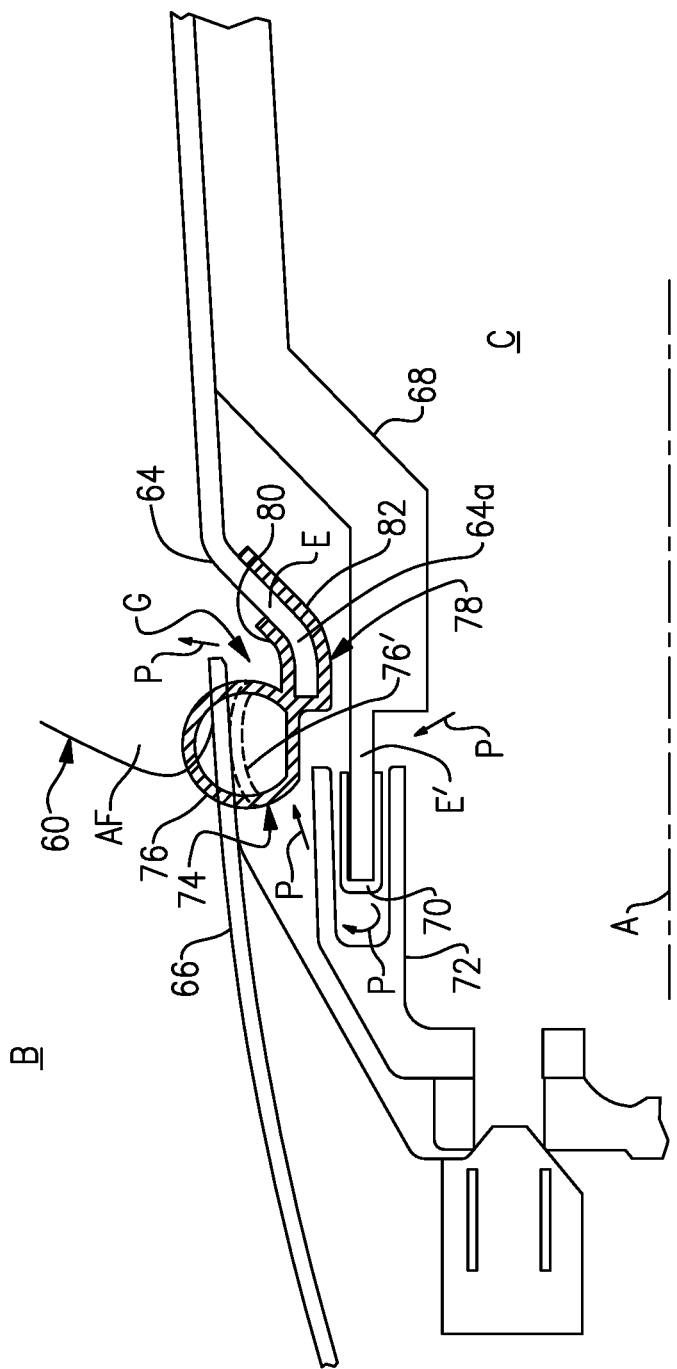
FIG. 2 illustrates a vane structure and a seal configured to control fluid leakage between a bypass passage and a core engine.

Referring also to FIG. 2, the engine 20 can include structural guide vanes 60 that extend between a first, outer case structure or panel 62 and a second, inner case structure or panel 64. Each structural guide vane 60 includes an airfoil AF and a base 66 secured with the airfoil AF. If there are gaps G between the end of the inner panel 64, such as at a forward end, and the structural guide vanes 60 (at base 66), the gaps G can debit the aerodynamic performance of the engine 20. In this example, the panel 64 is rigidly secured at an aft end (not shown) to a bracket 68, such as by a bolt or other fastener. However, the forward ends E/E' of the panel 64 and bracket 68, respectively, are free. The forward end E' of the bracket 68 includes a wear member 70 that is non-rigidly received into another bracket 72 such that loads exerted on the brackets 68/72 are decoupled from each other. The wear member 70 provides a low-friction interface with the bracket 72 and facilitates damping vibrations. The size of the gap G can vary due to thermal growth of the components, dimensional tolerances or both. Similar gaps may also exist elsewhere in the engine 20.

A seal 74 is provided to prevent or limit air from traveling through the gap G between the inner panel 64 and the structural guide vanes 60. For example, the seal 74 is flexible and includes a rounded bulb shaped portion 76, but could alternatively be a flap seal. In this example, the rounded bulb shaped portion 76 is hollow and can have open ends such that the rounded bulb shaped portion 76 compresses against the base 66, as indicated in phantom at 76'. In a further example, the seal 74 can be fabricated of an elastomeric material or a reinforced elastomeric material. The reinforced elastomeric material can be reinforced with a fabric or fiber material that is impregnated with a rubber material, such as silicone. The reinforcement provides stiffening and enhanced durability.

In this example, the seal 74 includes an attachment section 78 that is configured to secure the seal 74 to the panel 64. The attachment section 78 includes a pair of spaced-apart legs 80/82, between which a section 64a of the panel 64 is received. The seal 74 can be press-fit onto the section 64a. Optionally, an adhesive can additionally be used to secure the seal 74.

The section 64a of the panel 64 slopes inwards towards the central axis A (shown schematically) of the engine 20. In this example, the sloping of the section 64a locates the bulb shaped portion 76 of the seal 74 inwards of the base 66 of the structural guide vane 60, such that the bulb shaped portion 76 bears against, and thus seals, the underside of the base 66.

The seal 74, along with the radially inwardly-located wear member 70 on the bracket 68, are arranged in a gas passage P between the core engine C and the bypass flowpath B. The seal 74 thus controls gas flow through the gas flow passage P. It is to be understood that although the flow through the gas passage P is shown in one direction, the flow can be reversed depending upon the design and operating pressures.

Figure 3:
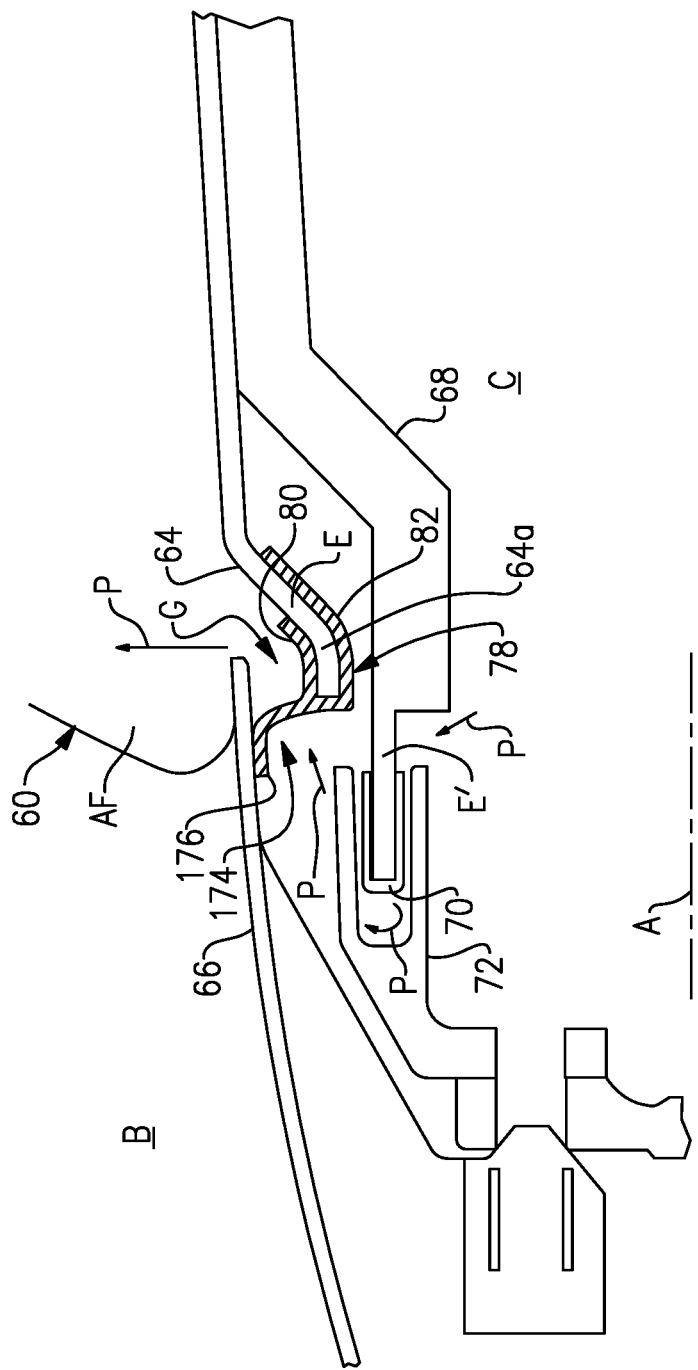
FIG. 3 illustrates another example of a seal configured to control leakage between a bypass passage and a core engine.

FIG. 3 shows another example seal 174 that can alternatively be used to prevent or limit air from traveling through the gap G between the panel 64 and the structural guide vanes 60. In this example, the seal 174 includes a flap 176 rather than the rounded bulb shaped portion 76 as shown in FIG. 2. The flap 176 is flexible and can be fabricated of elastomeric or reinforced elastomer material, as described.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a core engine;
   a fan coupled to be driven about a central longitudinal engine axis by the core engine;
   an inner case structure around the core engine;
   an outer case structure around the fan, the inner case structure and the outer case structure defining a bypass passage there between;
   a vane structure including an airfoil and a base secured with the airfoil, the base having a radially inward-facing surface, the airfoil extending radially between the inner case structure and the outer case structure, the inner case structure having a forward end that is radially inwards of the base; and
   a seal configured to control fluid leakage between the bypass passage and the core engine, the seal abutting the radially inward-facing surface of the base.

2. The gas turbine engine as recited in claim 1, wherein the seal includes a hollow portion.

3. The gas turbine engine as recited in claim 1, wherein the seal is flexible.

4. The gas turbine engine as recited in claim 1, wherein the seal is elastomeric.

5. The gas turbine engine as recited in claim 1, wherein the seal includes reinforced elastomer.

6. The gas turbine engine as recited in claim 1, wherein the seal includes a rounded, hollow bulb.

7. The gas turbine engine as recited in claim 1, wherein the seal includes an attachment section securing the seal to the forward end of the inner case structure.

8. The gas turbine engine as recited in claim 7, wherein the attachment section includes a pair of spaced apart legs.

9. The gas turbine engine as recited in claim 1, wherein the seal is within a gas passage between the core engine and the bypass passage, and further comprising a wear member within the gas passage radially inwards of the seal.

10. The gas turbine engine as recited in claim 1, wherein the seal includes a seal flap bearing against the radially inward-facing surface of the base.

11. The gas turbine engine as recited in claim 1, wherein the seal includes a fiber reinforcement impregnated with an elastomer.

12. The gas turbine engine as recited in claim 11, wherein the fiber reinforcement is a fabric.

13. The gas turbine engine as recited in claim 12, wherein the elastomer is silicone.

14. The gas turbine engine as recited in claim 13, wherein the seal includes a rounded, hollow bulb.

15. The gas turbine engine as recited in claim 1, wherein the forward end of the inner case structure slopes toward the central longitudinal engine axis such that the forward end is radially inwards of the radially inward-facing surface of the base.

16. A gas turbine engine comprising:
   a vane structure including an airfoil disposed about a central longitudinal engine axis, the vane structure including a radially inward-facing surface;
   a panel including a forward section arranged radially inwards of the vane structure, wherein the panel bounds a fan bypass passage; and
   a seal arranged radially inwards of the vane structure, between the vane structure and the panel, the seal sealing against the radially inward-facing surface.

17. The gas turbine engine as recited in claim 16, wherein the seal is flexible.

18. The gas turbine engine as recited in claim 16, wherein the seal includes a rounded, hollow bulb.

19. The gas turbine engine as recited in claim 16 wherein the seal is within a gas passage between the core engine and the bypass passage, and further comprising a wear member within the gas passage radially inwards of the seal.

20. The gas turbine engine as recited in claim 16, wherein the seal includes an attachment section securing the seal to the panel, the attachment section including a pair of spaced apart legs.

21. The gas turbine engine as recited in claim 16, wherein the seal includes a seal flap bearing against the radially inward-facing surface of the vane structure.

22. A gas turbine engine comprising:
   a vane structure including an airfoil disposed about a central longitudinal engine axis, the vane structure including a radially inward-facing surface;
   a panel including a forward section arranged radially inwards of the vane structure, wherein the panel bonds a fan bypass passage; and
   a seal arranged radially inwards of the vane structure, between the vane structure and the panel, the seal sealing against the radially inward-facing surface, wherein the seal includes a hollow portion.

* * * * *

UNITED STATES PATENT AND TRADEMARK OFFICE
CERTIFICATE OF CORRECTION

PATENT NO. : 9,909,503 B2
APPLICATION NO. : 14/428379
DATED : March 6, 2018
INVENTOR(S) : Keith T. Salamon, Matthew A. Turner and Christopher M. Quinn Page 1 of 1

It is certified that error appears in the above-identified patent and that said Letters Patent is hereby corrected as shown below:

In the Claims

In Claim 22, Column 6, Line 57; replace "bonds" with --bounds--

Signed and Sealed this
Twenty-ninth Day of October, 2019

Andrei Iancu
*Director of the United States Patent and Trademark Office*